United States Patent
Bhatti et al.

(10) Patent No.: US 7,660,821 B2
(45) Date of Patent: Feb. 9, 2010

(54) DATA STORAGE SYSTEM

(75) Inventors: Shahzad H. Bhatti, Boise, ID (US);
Cyrille de Brebisson, Boise, ID (US);
Martin J. Marx, Boise, ID (US);
Robert Mejia, Boise, ID (US); Michael F. Altree, Meridian, ID (US); Raymond A. Siuta, Corvallis, OR (US); Steven C. Johnson, Eagle, ID (US); Ricardo F. Garcia, Aguadilla, PR (US); Jorge L. Andujar, Isabela, PR (US)

(73) Assignee: Hewlett-Packard Development, Company, L.P., Houston, TX (US)

( * ) Notice: Subject to any disclaimer, the term of this patent is extended or adjusted under 35 U.S.C. 154(b) by 1289 days.

(21) Appl. No.: 10/631,609

(22) Filed: Jul. 31, 2003

(65) Prior Publication Data
US 2005/0027706 A1 Feb. 3, 2005

(51) Int. Cl.
*G06F 17/30* (2006.01)

(52) U.S. Cl. .................................. 707/104.1

(58) Field of Classification Search ............ 707/1–10, 707/100–104.1, 200–206; 717/101, 108, 717/120, 121; 709/212, 213, 245; 703/22, 703/24, 25; 715/826; 714/38, 763; 713/200; 725/138; 719/238
See application file for complete search history.

(56) References Cited

U.S. PATENT DOCUMENTS

| | | | | |
|---|---|---|---|---|
| 6,321,358 | B1* | 11/2001 | Anderson | 714/763 |
| 6,591,272 | B1* | 7/2003 | Williams | 707/102 |
| 6,850,252 | B1* | 2/2005 | Hoffberg | 715/716 |
| 6,870,546 | B1* | 3/2005 | Arsenault et al. | 345/619 |
| 2002/0112180 | A1* | 8/2002 | Land et al. | 713/200 |
| 2004/0139483 | A1* | 7/2004 | Kim et al. | 725/138 |
| 2004/0187140 | A1* | 9/2004 | Aigner et al. | 719/328 |

* cited by examiner

*Primary Examiner*—Diane Mizrahi (57) ABSTRACT

Object-oriented data storage. A system and method is disclosed for enhanced data storage. A system for object-oriented data storage may comprise an intelligent object editor capable of accessing data content and a destination storage device coupled to the intelligent object editor. The intelligent object editor can link associated information to data content to create a storage object. The storage object can then be stored to the destination storage device.

33 Claims, 4 Drawing Sheets

DATA STORAGE SYSTEM

BACKGROUND

As data storage devices become available in increasingly large capacities, managing the performance and management of the data storage becomes increasingly difficult. With very large capacity data storage, simply accessing the information (storing and retrieving data) can become more complicated and less efficient. In part, this difficulty may be viewed as presenting a hardware issue that might be addressed by developing the most efficient access circuitry and physical layout of the data storage components as possible. In addition, however, the problem could also be viewed as a software issue that might be addressed by enhancing the organization and management of the data stored in the data storage device.

Computer software has also followed a similar trend of increasing size and complexity. As the software complexity and size increases so does the difficulty in creating, modifying, and maintaining the software. In an attempt to address these issues, the field of software engineering has proposed more efficient software development models. In particular, object-oriented programming has emerged as a software schema that can speed the development of new programs and, if properly used, may improve the maintenance, reusability, and modifiability of software.

When object-oriented programming first arrived, it was viewed as a rather revolutionary concept that changed the rules in computer program development. Object-oriented programming is organized around "objects" rather than "actions," data rather than logic. Historically, a program has been viewed as a logical procedure that takes input data, processes it, and produces output data. The programming challenge was seen as how to write the logic, not how to define the data. In object-oriented programming, the emphasis is on the objects to be manipulated rather than the logic required to manipulate them.

In general, object-oriented programming is understood in the art as a type of programming in which programmers focus on data as opposed to the actions or logic of the program being developed. The programmers can define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

Given that similar issues of complexity and size are currently being faced in the world of data storage, it would be desirable to apply some of the precepts of the object-oriented paradigm to the emerging issue of balancing performance and management of data storage devices having ever-increasing capacity.

BRIEF SUMMARY

Object-oriented data storage is disclosed. A system for object-oriented data storage may comprise an intelligent object editor capable of accessing data content and a destination storage device coupled to the intelligent object editor. The intelligent object editor can link associated information to data content to create a storage object. The storage object can then be stored to the destination storage device.

BRIEF DESCRIPTION OF THE DRAWINGS

For a detailed description of the exemplary embodiments of the invention, reference will now be made to the accompanying drawings in which.

NOTATION AND NOMENCLATURE

Certain terms are used throughout the following description and claims to refer to particular components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

DETAILED DESCRIPTION

The following discussion is directed to various embodiments of the invention. Unless otherwise specified, the embodiments disclosed should not be interpreted as limiting, or otherwise used to limit, the scope of the disclosure or claims. In addition, one skilled in the art will understand that the following description has broad application. The discussion of any embodiment is meant only to be exemplary of that embodiment and is not intended to suggest that the scope of the disclosure or claims is limited to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. Further, all functions described herein may be performed in either hardware or software, or a combination thereof, unless indicated otherwise.

Figure 1:
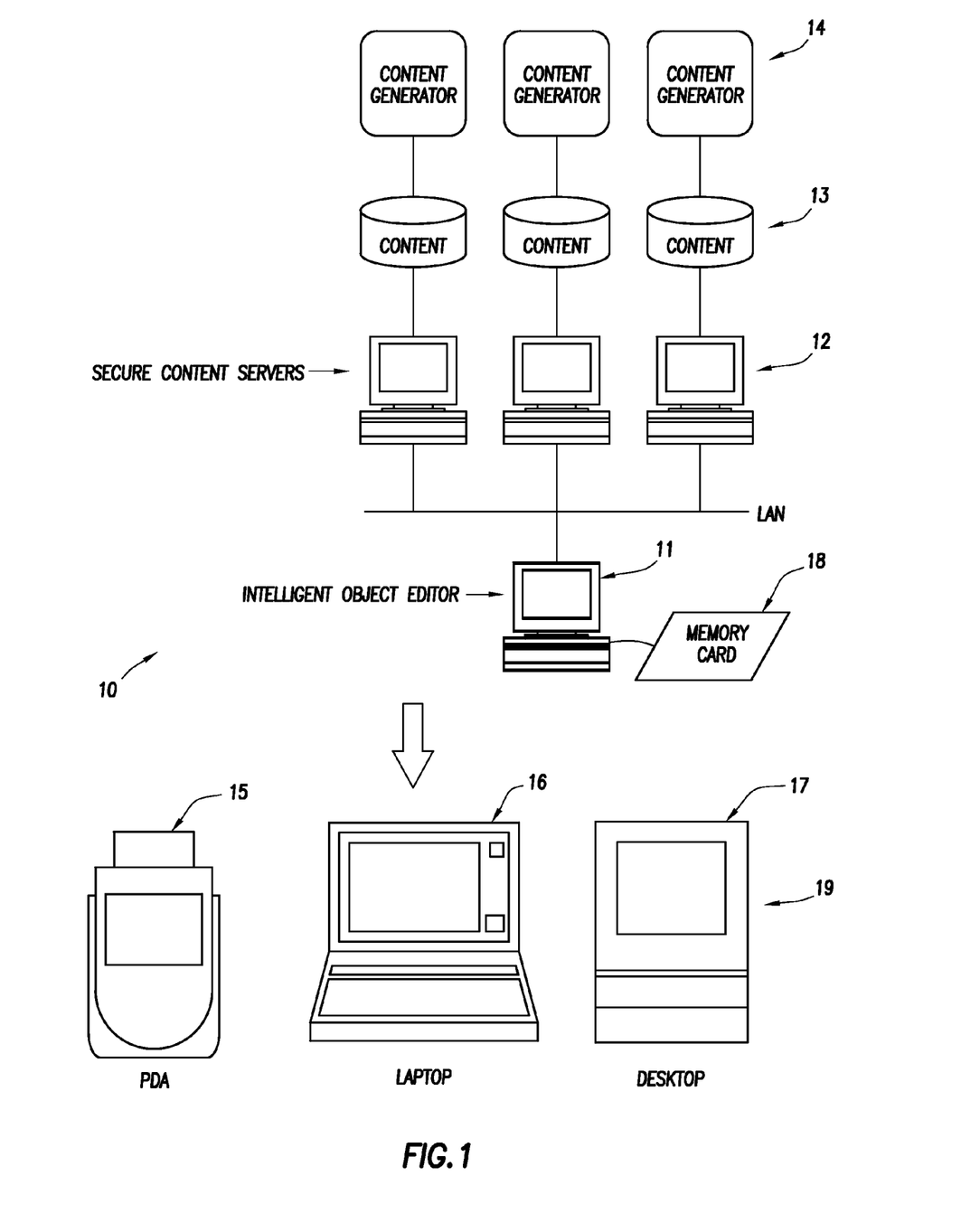
FIG. 1 is a system diagram of an embodiment of a system for object-oriented data storage.

Referring initially to FIG. 1, an embodiment of a system 10 for object-oriented data storage is shown. In the FIG. 1 embodiment of the system 10, an intelligent object editor 11 is coupled to secure content servers 12 via a Local Area Network (LAN). The secure content servers 12 are coupled to data storage devices 13. The data storage devices 13 are in turn coupled to content generators 14. Access devices 19, such as a Personal Digital Assistant (PDA) 15, laptop 16, or desktop computer 17, can also be coupled to the intelligent object editor 11.

The secure content servers 12 provide access to data content stored on data storage devices 13. Content generators 14 produce the data content. In the embodiment of FIG. 1, the intelligent object editor 11 can access the data content via the secure content servers 12. In addition, the intelligent object editor 11 may be accessed by various remote access devices 19 such as a PDA 15, laptop 16, or desktop computer 17. The access devices 19 may obtain the data content from the intelligent object editor 11.

A content generator 14 creates data content that can then be stored on storage devices 13. The data content can be data from any computer or electronic application. For instance, the data may be audio data such as mp3 files, video data such as mpeg files, documents such as word processor files, customer or personnel information such as database files, for example. Accordingly, a content generator 14 can be any computer or electronic application or device that generates data content, for example, a digital audio recorder, a digital camera, a word processor, or a computer system running any of a myriad of applications. The information stored in the data content may be played, viewed, edited, or otherwise accessed via applications specific for the type of data content (herein "access applications"). Such access applications include audio players for audio content, video players or photo shops for video content, word processors for documents, and database applications for database information, for example.

In the embodiment of the system 10 shown in FIG. 1, the data content is accessed via secure content servers 12. The data content may be stored locally or remotely, i.e., on data storage devices 13 that are local to the servers 12 or remote from the servers 12. The servers 12 may be "secure" servers in that they manage and control access to the data content, and prevent unauthorized access to the data storage devices 13 and the data content thereon. Secure content servers 12 are generally used by companies or individuals to protect their proprietary information stored as data content on the data storage devices 13.

As illustrated in FIG. 1, the data content may be stored on one or many data storage devices 13. In addition, one or more servers 12 may access these data storage devices 13. Accordingly, the intelligent object editor 11 may have to access one or more servers 12 and data storage devices 13 to access the desired data content. Once the data content is accessed by the intelligent object editor 11, the intelligent object editor 11 facilitates linking the data content with functions, attributes, events, and possibly other information to create an integrated packet of associated information with the data content, referred to herein as a storage object. The storage object can be stored to a destination storage device 18 for later access.

In this embodiment of the system 10, the destination storage device 18 is a memory card coupled directly to the intelligent object editor 11. However, the destination storage device 18 could be any type of data storage device and could be local or remote from the intelligent object editor 11. Additionally, by adding processing capability directly to a storage device, the intelligent object editor 11 could be resident on the destination storage device 18 itself. Whether remote or local to the intelligent object editor 11, the intelligent object editor 11 stores the storage objects on the destination storage device 18. A data storage device from which data content is being accessed by the intelligent object editor 11, such as a data storage device 13, may be called a source storage device. A data storage device to which objects are being stored by the intelligent object editor 11 (such as the memory card 18) may be called a destination storage device. The source and destination storage devices 13, 18 may be any type of memory or storage capable of storing data. Examples of storage devices 13, 18 would include hard disk drives, tape drives, memory cards, memory sticks, CD drives, DVD drives, ROM, RAM.

As used herein, the term function(s) generally refers to any type of action or operation that might be performed on or to the data content. These might include simple arithmetic operations for data content consisting of numeric values, or more complex operations such as applying a DSP (digital signal processing) algorithm like "concert hall" to audio data content. Generally, any operation or action that might be applied to the data content will be referred to as a function herein.

Correspondingly, as used herein the term attribute(s) generally refers to any identifier, characteristic, or descriptor that might be associated with data content for purposes of identifying or informing the data content for any purpose. These attributes might include simple identifiers such as whether the data content is numeric or alphabetic, or more complex identifiers such as metatag information or source identifying information such as audio content, video, for example. Generally, the attributes provide characteristic information about the data content to which they are linked in the storage object. Such information could be used for any purpose such as sorting the storage objects, searching for storage objects, identifying types of data content in storage objects, identifying sources of data content in storage objects, for example.

As used herein, the term event(s) is used to refer to any happening the occurrence of which will initiate a function to be performed on the associated data content of a storage object. For example, in a storage object containing audio data, an associated event might indicate that a DSP function should be initiated and employed on the data whenever the data content is accessed for playback. Thus, an audio player accessing the data content of the storage object for playback would automatically initiate the DSP function, thereby enhancing the playback of the data content of the storage object. Thus, the playback of the data content in the storage object would be informed by the event and function linked to the storage object.

In the FIG. 1 embodiment of the system 10, the intelligent object editor 11 enables data content to be linked to associate information (such as functions, attributes, and events, for example) that might be desirable to associate with the data content. The data content and its associated information can then be stored to a destination storage device 18 as an integrated storage object. The intelligent object editor 11 might automatically create some associations for the storage objects. Alternatively, the intelligent object editor 11 may enable other applications or users to form the storage objects by linking data content and associated information. Moreover, the intelligent object editor 11 may provide a user interface for a user to easily select and modify storage objects and their associated information. An embodiment of a user interface is discussed more fully in relation to FIG. 2 below.

Once the storage objects are stored on the destination storage device 18, other devices or applications such as the accessing devices 19 or access applications running on other devices may seek access to the storage objects. In this embodiment of the system 10, the accessing devices 19 would couple to the intelligent object editor 11, and the intelligent object editor 11 would manage and control the access to the storage objects on the destination storage device 18. Alternatively, other accessing devices or access applications could access the storage objects directly from the destination storage device 18. By accessing the data content linked with associated information (such as functions, attributes, events, for example), the accessing devices or applications may gain certain advantages or efficiencies as opposed to accessing the data content itself. For example, the accessing device or application 19 might more efficiently identify the data content desired by being able to sort or search the storage objects by their associated attributes. The accessing device 19 might also be able to identify functions that could be used on the data content. Rather than attempting a function on data content not compatible with that function or operation, the storage object could identify functions that can be performed on the data content. Additionally, the data content might be more efficiently used by having some functions initiated by events associated with the storage object, i.e., initiating certain DSP functions on audio data content when playback is initiated. These are just a few examples of the enhanced utility resulting from the data storage utilizing storage objects as opposed to only the data content files. The raw data content could still be accessed directly if desired. In addition, any associated functions or attributes could also be stored and accessed separately as well. The linking of the data content with the associated information into storage objects can provide additional and enhanced means of accessing and utilizing the stored data content.

Figure 2:
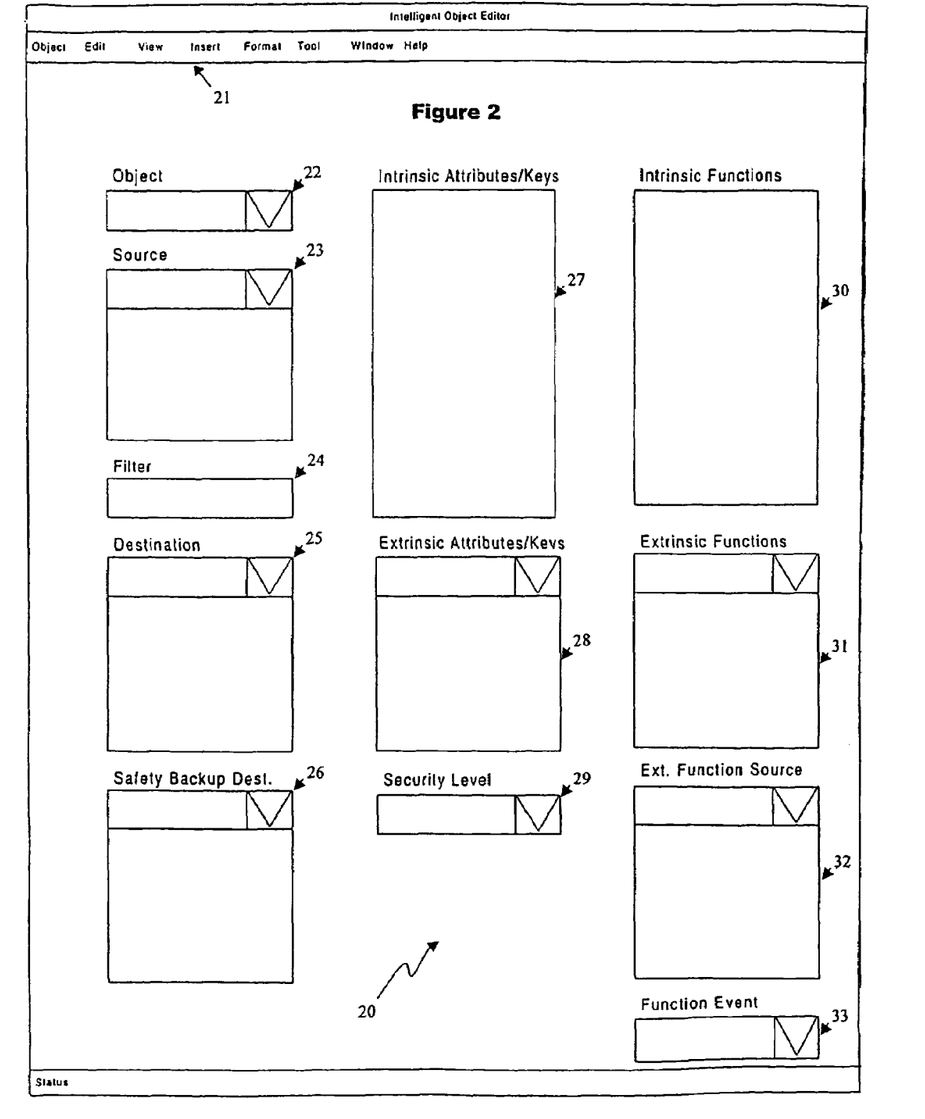
FIG. 2 is diagram illustrating an embodiment of a user interface for a system for object-oriented data storage.

FIG. 2 illustrates an embodiment of a user interface 20 that may be used in a system for object-oriented data storage. The user interface 20 of FIG. 2 is a screen that could be presented to a user to operate the intelligent object editor. More specifically, the screen enables the user to edit storage objects and their associated information using the intelligent object editor.

This embodiment of the user interface 20 comprises a toolbar 21, an object window 22, a source window 23, a filter window 24, a destination window 25, a safety backup destination window 26, an intrinsic attribute window 27, an extrinsic attribute window 28, a security level window 29, an intrinsic function window 30, an extrinsic function window 31, an extrinsic function source window 32, and a function event window 33.

The user interface 20 presented in FIG. 2 enables a user to edit storage objects via the intelligent object editor. If the user wants to create a new storage object, a similar user interface would be presented. To edit a storage object, the user would first select a storage object for editing via the object window 22 shown in the upper left portion of the user interface 20. Selecting the arrow at the right of the object window 22 presents a drop-down list of the storage objects available. In this embodiment, a cached list of the objects most recently accessed would be presented. However, the list could also be a comprehensive list of all available storage objects on the system. The user can then select the desired storage object from the list presented.

If the user does not find the desired storage object from the drop-down list in the object window 22, the source window 23 can be used to facilitate finding the desired storage object for editing. The source window 23 is shown just beneath the object window 22. The source window 23 allows the user to select the source from which the object is to be retrieved. The source may be a local disk (c:\), a web site (url), or any primary or secondary storage device. Selecting the arrow at the top right of the source window 23 presents a drop-down menu of available sources. Once a source has been selected, the remainder of the source window 23 presents a list of storage objects available from that source. The user may then select the desired object from this list. Once a storage object has been selected, the selected object will be shown in the object window 22. Thus, the object window 22 identifies which storage object has been selected for editing.

The filter window 24 is shown just beneath the source window 23. The filter window 24 can also facilitate the selection of the desired storage object to be edited. Once a source has been selected in the source window 23, the user can select a filter via the filter window 24 to reduce the number of available storage objects presented in the source window 23. The filter may be based on any characteristic of the objects such as file type or extension, or the associated information of the storage objects (such as the attributes, functions, or events, for example). Thus, the filter window 24 enables the user to see only storage objects in the source window 23 that match certain criteria. For example, the user could use the filter window 24 to view only storage objects that comprise audio data content by choosing a filter that would eliminate objects not having certain audio-related attributes, functions, or other associated information.

The destination window 25 is shown just beneath the filter window 24. The destination window 25 enables the user to select the destination storage device for the storage object. The destination storage device can be any type of memory or data storage device. The desired destination can be selected from the drop-down list of available destination storage devices. The drop-down list can be accessed by selecting the arrow in the top right corner of the destination window 25. Once a destination storage device has been selected, a list of the storage objects at that destination may be displayed in the remainder of the destination window 25.

The safety backup destination window 26 is shown just beneath the destination window 25. The safety backup destination window 26 enables the user to select a backup destination storage device for the storage object. The backup destination storage device can also be any type of memory or data storage device. The desired backup destination can be selected from the drop-down list of available backup destination storage devices. The drop-down list can be accessed by selecting the arrow in the top right corner of the safety backup destination window 26. Once a backup destination storage device has been selected, a list of the storage objects at that backup destination may be displayed in the remainder of the safety backup destination window 26.

In the FIG. 2 embodiment of the user interface 20, the intrinsic attributes window 27 is shown in the top center of the user interface 20. The intrinsic attributes window 27 presents intrinsic attributes of the selected storage object. Intrinsic attributes are those attributes immutably associated with the storage object. Intrinsic attributes cannot be modified. An attribute can be any identifier, characteristic, descriptor that might be associated with data content for purposes of identifying or informing the data content for any purpose. These might include simple identifiers such as whether the data content is numeric or alphabetic, or more complex identifiers such as metatag information or source identifying information such as audio content, video.

Beneath the intrinsic attribute window 27 is the extrinsic attribute window 28. The extrinsic attribute window 28 presents extrinsic attributes of the selected storage object. Extrinsic attributes are those attributes mutably associated with the storage object. Extrinsic attributes can be modified. Selecting the arrow in the top right corner of the extrinsic attribute window 28 presents a drop-down menu of attributes that may be linked with the selected storage object. The user can select one of the listed attributes. The selected attribute will then be displayed in the top section of the extrinsic attribute window 28. Double clicking on the selected attribute will link the attribute to the selected storage object. The selected attribute will then be added to the attributes already linked with the selected storage object. All extrinsic attributes linked to the selected storage object are displayed in the remainder of the extrinsic attribute window 28 beneath the selection area. Extrinsic attributes may be removed from the selected storage object by right clicking on the attribute and selecting delete from the pop-up menu, or by simply dragging a selected attribute out of the extrinsic window 28.

The security level window 29 is shown just beneath the extrinsic attribute window 28. The security level window 29 enables the user to select a security level for the selected storage object. The security level assigned to the storage objects corresponds to security credential levels assigned to users, or other applications or devices, attempting to access the storage objects. Thus, a user of insufficient security level would be denied access to a storage object, while users having a sufficient level of security credentials would be given access. A multitude of security protocols are available for controlling or limiting access to the storage objects. The security level window 29 can be used to set the desired security level for the selected storage objects.

In the FIG. 2 embodiment of the user interface 20, the intrinsic function window 30 is shown in the top right of the user interface 20. The intrinsic function window 30 presents intrinsic functions of the selected storage object. Intrinsic functions are those functions that are immutably associated with the storage object. Intrinsic functions cannot be modified. A function can be any type of action or operation that might be performed on or to the data content. These might include simple arithmetic operations for data content consisting of numeric values, or more complex operations such as applying a DSP (digital signal processing) algorithm like "concert hall" to audio data content. Generally, any operation or action that might be applied to the data content will be referred to as a function herein.

Beneath the intrinsic function window 30 is the extrinsic function window 31. The extrinsic function window 31 presents extrinsic functions of the selected storage object. Extrinsic functions are those functions mutably associated with the storage object. Extrinsic functions can be modified. Selecting the arrow in the top right corner of the extrinsic function window 31 presents a drop-down menu of functions that may be linked with the selected storage object. The user can select one of the listed functions. The selected function will then be displayed in the top section of the window 31. Double clicking on the selected function will link the function to the selected storage object. The selected function will then be added to the functions already linked with the selected storage object. All extrinsic functions linked to the selected storage object are displayed in the remainder of the extrinsic function window 31 beneath the selection area. Functions may be removed from the selected storage object by right clicking on the function and selecting delete from the pop-up menu, or by simply dragging a selected function out of the extrinsic function window 31.

The extrinsic function source window 32 is shown beneath the extrinsic function window 31. The extrinsic function source window 32 facilitates selecting functions for linking to the selected object, particularly where the functions may be stored on multiple storage devices. Extrinsic function source window 32 enables the user to select the source from which the function is to be retrieved. The source may be a local disk (c:\), a web site (url), or any primary or secondary storage device. Selecting the arrow at the top right of the extrinsic function source window 32 presents a drop-down menu or list of available sources. Once a source has been selected, the remainder of the extrinsic function source window 32 presents a list of functions available from that source. The user may select the desired function from this list. The selected function will then appear in the extrinsic function window 31 with the other extrinsic functions associated with the storage object. Although not shown in this embodiment of the user interface 20, a similar source window could be provided for the extrinsic attributes to facilitate the selection of extrinsic attributes as well.

The function event window 33 is shown beneath the extrinsic function source window 32. The function event window 33 enables the user to select an event that will initiate a selected function. The occurrence of an event initiates a function performed on the associated data content of the selected storage object. For example, in a storage object containing audio data, an associated event might indicate that a DSP function should be initiated and employed on the data when the data content is accessed for playback. Thus, an audio player accessing the data content of the storage object for playback would initiate the DSP function. In this way, the playback of the data content of the storage object is informed by the event and function linked to the storage object. The user may select an event via the arrow at the top right of the function event window 33. Selection of the arrow presents a drop-down list of the available events that may be linked with the function and corresponding storage object selected. Any function may be selected by highlighting the function in either the intrinsic function window 30 or the extrinsic function window 31. The storage object selected will appear in the storage object window 22.

The toolbar 21 is shown at the top of the user interface 20. The toolbar 21 operates similarly to most application toolbars in that selecting items on the toolbar presents pull-down menus to the user. The user may perform similar tasks and operations from the toolbar and pull-down menus as those described above. Thus, the user would have the option of selecting tasks and operations of the intelligent object editor via the toolbar 21 or the windows 22-33. Additional user interface screens similar to the embodiment shown in FIG. 2 may be presented to further facilitate use of the intelligent object editor, and more specifically, to facilitate the creation and editing of storage objects and their associated information.

Figure 3:
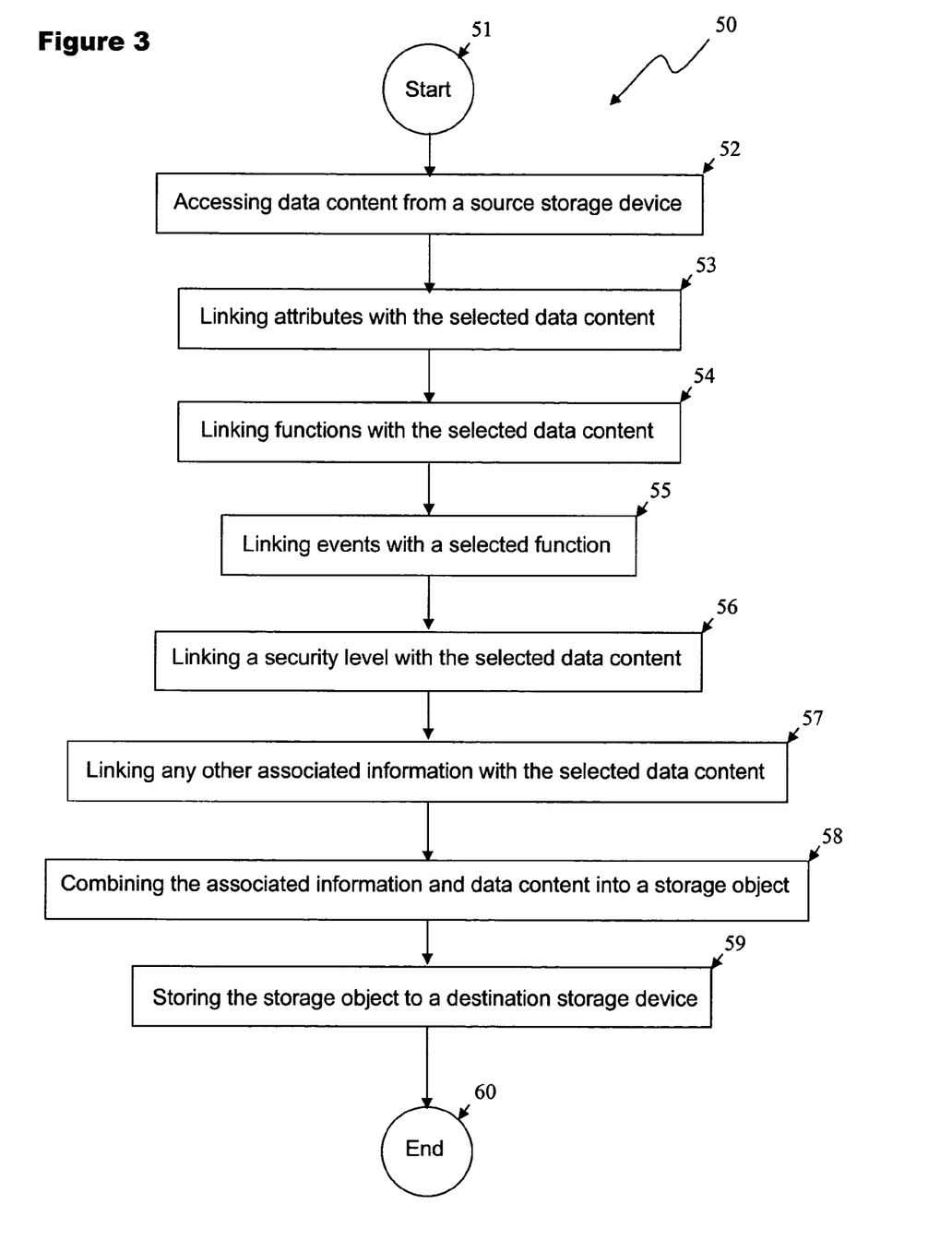
FIG. 3 is a flow chart illustrating an embodiment of a method for object-oriented data storage.

FIG. 3 is a flow chart illustrating an embodiment of an object-oriented data storage method 50. The method 50 starts at 51. Once the object-oriented data storage method 50 has been initiated, the data content is accessed from a source storage device as indicated in box 52. The data content can be of many types and may be stored on multiple local or remote source storage devices. In addition, access to the data content may be protected by secure servers or other security means. The data content may be accessed or in any manner received or retrieved. Once the data content has been accessed, associated information can then be linked with the data content to form an integrated storage object.

In box 53, desired attributes are linked with the data content. Attributes may be any identifier, characteristic, descriptor that might be associated with data content for purposes of identifying or informing the data content for any purpose. For example, attributes may include simple identifiers such as whether the data content is numeric or alphabetic, or more complex identifiers such as metatag information or source identifying information such as audio content or video content, for example. An attribute may be used to provide characteristic information about the data content to which the attribute is linked in the storage object. Such information could be used for any purpose such as sorting the storage objects, searching for storage objects, identifying types of data content in storage objects, identifying sources of data content in storage objects.

In box 54, desired functions are linked to the data content. A function may be any type of action or operation that might be performed on the data content. For example, functions may include simple arithmetic operations for data content consisting of numeric values, or more complex operations such as applying a DSP (digital signal processing) algorithm like "concert hall" to audio data content. In box 55, desired events may be linked to the data content. The occurrence of an event initiates a function performed on the associated data content of a storage object. For example, in a storage object containing audio data, an associated event might indicate that a DSP function should be initiated and employed on the data whenever the data content is accessed for playback. In box 56, a security level can be linked to the data content. The security level can be used to limit or control access to the data content or storage object. In box 57, other associated information may be linked to the data content. Such information could take many forms, for instance metatag information, original source location of the data content, origination date of the data content. This information could be linked as an attribute, function, event, security level, or some other type of associated information linked to the data content.

As indicated in box 58, once all desired associated information has been linked with the data content, the data content and associated information are identified as an integrated storage object. Once a storage object has been created, an attempt to access the data content in the storage object will inherently include the retrieval of the associated information for the storage object. The storage object can then stored to a destination storage device in box 59. The method ends at 60.

Figure 4:
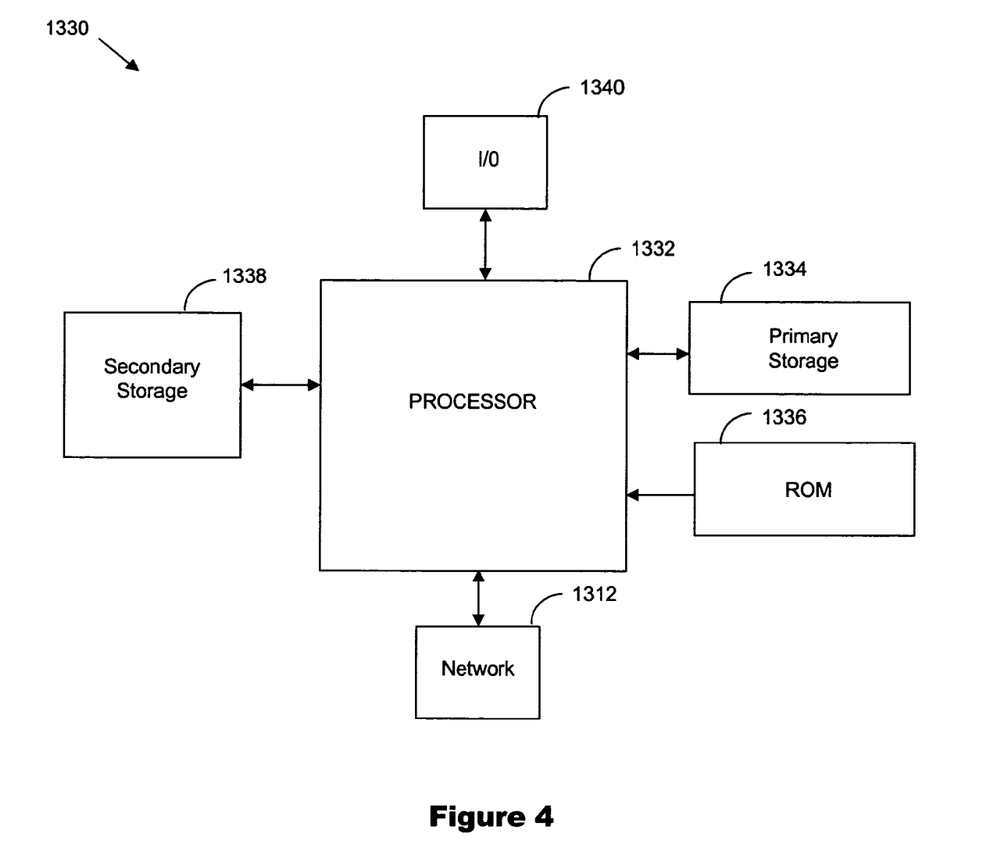
FIG. 4 is a system diagram illustrating an embodiment of a general-purpose computer system on which a system and method for object-oriented data storage could be operated in whole or in part.

FIG. 4 is a system diagram illustrating an embodiment of a general-purpose computer system on which a system and method for object-oriented data storage could be operated in whole or in part. The system and method for object-oriented data storage as described herein may be implemented in whole or in part on a variety of different computer systems. FIG. 4 illustrates one such general-purpose computer system. The computer system 1330 includes a processor 1332 (also referred to as a central processing unit, or CPU) that is coupled to memory devices including primary storage devices 1336 (such as a read only memory, or ROM) and primary storage devices 1334 (such as a random access memory, or RAM).

Generally, ROM transfers data and instructions uni-directionally to CPU 1332, while RAM generally transfers data and instructions in a bi-directional manner. Both storage devices 1334, 1336 may comprise any suitable computer-readable media. A secondary storage medium 1338, which is generally a mass memory device, is also coupled bi-directionally to CPU 1332 and provides additional data storage capacity. The mass memory device 1338 is a computer-readable medium that may be used to store programs including computer code, data. Mass memory device 1338 is generally a storage medium utilizing a non-volatile memory such as a hard disk or a tape that is generally slower than primary storage devices 1334, 1336. Mass memory storage device 1338 may take the form of a magnetic or paper tape reader or other known devices. The information retained within the mass memory device 1338 may, in appropriate cases, be incorporated as part of RAM 1336 as virtual memory.

CPU 1332 also couples to one or more input/output devices 1340 that may include devices such as video monitors, track balls, mice, keyboards, microphones, touch-sensitive displays, transducer card readers, magnetic or paper tape readers, tablets, styluses, voice or handwriting recognizers, or other known input/output devices including other computers. Finally, CPU 1332 optionally may be coupled to a computer or telecommunications network, e.g., an Internet network, or an intranet network, using a network connection as shown generally at 1312. With such a network connection, CPU 1332 may receive information from the network, or may output information to the network in the course of performing the processes and methods in accordance with the disclosure herein. Such information is often represented as a sequence of instructions to be executed using CPU 1332. The information may be received from and sent to the network, for example, in the form of a computer data signal embodied in a carrier wave.

In one embodiment, sequences of instructions may be executed substantially simultaneously on multiple CPUs, as for example a CPU in communication across network connections. Specifically, the above-described method may be performed across a computer network. Additionally, one of skill in the art will recognize that the method may be recognized as sets of computer codes and that such computer codes can be stored in computer readable media such as RAM, ROM, hard discs, floppy discs, carrier waves or other storage devices or media.

The above discussion is meant to be illustrative of the principles and various embodiments of the present invention. Numerous variations and modifications will become apparent to those skilled in the art once the above disclosure is fully appreciated. For example, the system and method for object-oriented data storage may at times incorporate more or less components or functions than the embodiments described herein. This disclosure makes those principles and modified embodiments apparent to those skilled in the art. It is intended that the following claims be interpreted to embrace all such variations and modifications.

What is claimed is:

1. A system for object-oriented data storage, comprising:
an intelligent object editor including a graphical user interface for creating a storage object, the creation of the storage object comprising:
accessing data content via the graphical user interface;
linking at least one attribute that describes the data content to the data content via the graphical user interface; and
linking at least one function selected from a plurality of functions that can be applied to the data content to the data content via the graphical user interface, the plurality of functions including at least one digital signal processing function;
a destination storage memory device coupled to the intelligent object editor for storing the created storage object.

2. The system of claim 1, further comprising:
a source storage memory device from which the intelligent object editor accesses the data content.

3. The system of claim 1, further comprising:
a secure content server that manages access to the data content wherein the intelligent object editor couples to the secure content server to access the data content.

4. The system of claim 1 further comprising:
an accessing device that requests access to the data content;
wherein the intelligent object editor receives the request from the accessing device, accesses the storage object having the data content from the destination storage memory device, and provides the accessing device with access to the storage object.

5. The system of claim 1, wherein the creation of the storage object at the intelligent object editor further comprises linking an event to the data content via the graphical user interface, wherein an occurrence of the event initiates application of one of the at least one functions on the associated data content of the storage object.

6. The system of claim 1 wherein the creation of the storage object at the intelligent object editor further comprises linking a security level to limit access to the storage object.

7. The system of claim 1 wherein the creation of the storage object at the intelligent object editor further comprises linking an arithmetic operation function to the data content.

8. The system of claim 1 wherein the at least one attribute provides information about the data content so the intelligent object editor can search and identify the storage object.

9. A system for object-oriented data storage, comprising:
an intelligent object editor for accessing data content and storage objects;
a destination storage memory device coupled to the intelligent object editor; and
a user interface, presented to a user, for operating the intelligent object editor to: (1) link at least one attribute that describes the data content to the data content to create a new storage object that is stored to the destination storage memory device, and (2) edit an existing storage object by modifying one of at least one function that is linked to the data content and is performed on the existing storage object when an event initiates the one of at least one function, the at least one function including a digital signal processing function.

10. The system of claim 9, wherein the user interface operates the intelligent object editor further to: (3) search for existing storage objects, and (4) select a destination storage memory device to store the new storage object.

11. The system of claim 9 wherein the user interface presents the user with data content and associated information for the user to select for linking to the data content of a storage object.

12. The system of claim 9 wherein the user interface comprises lists from which the data content and associated information are selected.

13. The system of claim 9 wherein the intelligent object editor enables previously created storage objects to be modified by the user.

14. The system of claim 9 wherein the intelligent object editor is a component of the destination storage memory device.

15. The system of claim 9, further comprising:
a backup destination storage memory device for storing a backup copy of the storage object.

16. A method for object-oriented data storage, comprising:
accessing data content from a source storage memory device;
selecting, from plural different functions, at least one function to be performed on the data content when a user selects an event associated with the data content via an intelligent object editor system, the plural different functions including a digital signal processing function;
selecting, from plural different attributes, at least one attribute that identifies the data content via the intelligent object editor system;
linking associated information, including the at least one function and the one attribute, to the data content to create a storage object; and
storing the storage object to a destination storage memory device.

17. The method of claim 16, further comprising:
storing the plural different functions on multiple storage devices;
presenting, on a screen, a list of the plural different functions.

18. The method of claim 16, wherein the intelligent object editor system includes a user interface further comprising:

inputting, through the user interface, filter criteria for searching storage objects;
searching for storage objects matching the filter criteria via the intelligent object editor system;
displaying, on the user interface, discovered storage objects.

19. The method of claim 16, further comprising:
interfacing with an accessing device seeking access to the data content.

20. The method of claim 19, further comprising:
providing the accessing device with access to the storage object having the data content.

21. The method of claim 19, further comprising:
controlling the access given to the accessing device.

22. The method of claim 19, further comprising:
initiating an action on the data content based on the associated information.

23. The method of claim 16, further comprising:
searching a plurality of storage objects using the associated information.

24. The method of claim 16, further comprising:
sorting a plurality of storage objects using the associated information.

25. A method comprising:
selecting data content from a source storage memory device;
linking, from input through a graphical user interface of an intelligent object editor system, at least one of function to be performed on the data content, the at least one function being selected from a plurality of functions including at least one digital signal processing function;
linking associated information, including the at least one function, to the data content to create a storage object via the graphical user interface;
storing the storage object to a destination storage memory device; and
performing the at least one function on the data content when a user initiates an event that accesses the data content.

26. The method of claim 25 further comprising
linking, from input through the graphical user interface of the intelligent object editor system, an attribute that identifies the data content in order to identify types of data content in storage objects stored in the destination storage memory device.

27. The method of claim 25 wherein linking associated information to the data content to create a storage object via the intelligent object editor system, comprises:
linking a security level to limit access to the storage object.

28. The method of claim 25 wherein linking associated information to the data content to create a storage object via the intelligent object editor system comprises:
linking an attribute to the data content.

29. The method of claim 25, wherein linking associated information to the data content to create a storage object via the intelligent object editor system comprises:
linking a function to the data content.

30. A system for object-oriented data storage, comprising:
means for displaying plural functions on a screen of an intelligent object editor system, the functions being performable on data content when a user selects an event associated with the data content, the plural functions including a digital signal processing function;
means for displaying on the screen plural attributes that identify the data content;

means for linking at least one displayed function and at least one displayed attribute to the data content to create a storage object at the intelligent object editor system; and means for storing the storage object to a destination storage memory device.

31. The system of claim 30 further comprising:

means for a user to select associated information to link to the data content to create a storage object via the intelligent editor system.

32. The system of claim 30 further comprising:

means for controlling access to the storage object stored at the destination storage memory device.

33. The system of claim 30 further comprising:

means for accessing the storage object stored at the destination storage memory device using the associated information.

* * * * *

UNITED STATES PATENT AND TRADEMARK OFFICE
CERTIFICATE OF CORRECTION

PATENT NO. : 7,660,821 B2 Page 1 of 1
APPLICATION NO. : 10/631609
DATED : February 9, 2010
INVENTOR(S) : Shahzad H. Bhatti et al.

It is certified that error appears in the above-identified patent and that said Letters Patent is hereby corrected as shown below:

In column 10, line 42, in Claim 1, after "applied" delete "to the data content".

In column 12, line 41, in Claim 26, after "comprising" insert -- : --.

Signed and Sealed this

Eighteenth Day of May, 2010

David J. Kappos
*Director of the United States Patent and Trademark Office*